(12) United States Patent
Inagaki et al.

(10) Patent No.: US 7,498,096 B2
(45) Date of Patent: Mar. 3, 2009

(54) SEAL ARRANGEMENT FOR FUEL CELLS

(75) Inventors: Toshiyuki Inagaki, Toyota (JP);
Tadahiro Ichioka, Kasugai (JP); Mikio Wada, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 10/349,946

(22) Filed: Jan. 24, 2003

(65) Prior Publication Data

US 2003/0150162 A1    Aug. 14, 2003

(30) Foreign Application Priority Data

Jan. 25, 2002  (JP) .............. 2002-016895
Sep. 17, 2002  (JP) .............. 2002-270299

(51) Int. Cl.
*H01M 2/08* (2006.01)
*H01M 2/16* (2006.01)

(52) U.S. Cl. .............. 429/36; 429/38; 429/35
(58) Field of Classification Search ............. 429/34–39
See application file for complete search history.

(56) References Cited

U.S. PATENT DOCUMENTS

| 6,815,115 B2 * | 11/2004 | Sugita et al. ............ 429/35 |
| 2002/0122970 A1 * | 9/2002 | Inoue et al. ............ 429/35 |
| 2003/0064272 A1 * | 4/2003 | Inagaki et al. ............ 429/34 |

FOREIGN PATENT DOCUMENTS

| DE | 101 07 790 A1 | 8/2002 |
| DE | 101 60 905 A1 | 7/2003 |
| JP | 07249417 A | 9/1995 |
| JP | 10302814 | 11/1998 |
| JP | 11-179755 A | 7/1999 |
| JP | 2000-182639 A | 6/2000 |
| JP | 2001-102072 | 4/2001 |
| JP | 2001-185174 | 7/2001 |
| JP | 2001-283893 A | 10/2001 |

OTHER PUBLICATIONS

German Language Version of German Office Action for Application No. 103 03 655.5-45 issued Oct. 11, 2006.
English Translation of German Office Action for Application No. 103 03 655.5-45 issued Oct. 11, 2006.
Japanese Language Version of Japanese Official Communication letter, Appln. No. 2003-006911 issued May 29, 2007.
Examiner's Comments regarding Japanese Official Communication letter, Appln. No. 2003-006911 issued May 29, 2007.

* cited by examiner

*Primary Examiner*—Tracy Dove
(74) *Attorney, Agent, or Firm*—Kenyon & Kenyon LLP

(57) ABSTRACT

A seal arrangement for a fuel cell structure is provided which includes a seal portion in the form of a gasket between adjacent fuel cells in a stack of fuel cells. In the seal arrangement, a portion of the fuel cell structure that overlaps the gasket as viewed in a direction of lamination of the cells has a constant-thickness structure having a substantially constant thickness. The seal arrangement may further be arranged to seal fuel cell coolant passages and manifolds from fuel cell gas passages.

11 Claims, 9 Drawing Sheets

SEAL ARRANGEMENT FOR FUEL CELLS

INCORPORATION BY REFERENCE

The disclosures of Japanese Patent Application No. 2002-016895 filed on Jan. 25, 2002 and No. 2002-270299 filed on Sep. 17, 2002, each including the specification, drawings and abstract, are incorporated herein by reference in their entireties.

BACKGROUND OF THE INVENTION

1. Field of the Invention

The invention relates to a seal arrangement for fuel cells, and, in particular, to a seal arrangement for solid polymer electrolyte fuel cells.

2. Description of Related Art

A fuel cell, such as a solid polymer electrolyte fuel cell, includes a membrane-electrode assembly (MEA) that consists of an electrolyte membrane in the form of an ion exchange membrane, an electrode (anode or fuel electrode) including a catalyst layer and a gas diffusion layer formed on one major surface of the electrolyte layer, and an electrode (cathode or air electrode) including a catalyst layer and a gas diffusion layer formed on the other major surface of the electrolyte layer. A unit cell is constituted by the membrane-electrode assembly (MEA), and one or more separators that form fluid passages through which fuel gas (hydrogen) and oxidizing gas (oxygen, or generally air) are supplied to the anode and cathode and/or channels through which a coolant flows. A laminated structure of at least one unit cell constitutes a module, and a plurality of modules are laminated on each other to provide a set of modules (or a set of cells when the module consists of one unit cell). Terminals, insulators and end plates are disposed on the opposite ends of the set of modules as viewed in the direction of lamination of the cells, so as to provide a fuel cell stack. The fuel cell stack is then fastened at the outside thereof by fastening members (such as tension plates) that extend in the direction of lamination of the cells, such that the modules or cells are fixed together.

In the solid polymer electrolyte fuel cell, a reaction that converts hydrogen into hydrogen ions and electrons occurs at the anode, and the hydrogen ions thus formed move to the cathode through the electrolyte membrane. As a result, a reaction of oxygen, hydrogen ions and electrons produced at the anode of the adjacent MEA and passing through the separator occurs at the cathode. These reactions are expressed as follows:

$H_2 \rightarrow 2H^+ + 2e-$ at the anode of the cell $2H^+ + 2e- + (\frac{1}{2})O_2 \rightarrow H_2O$ at the cathode of the cell In the fuel cells, Joule heat is generated, and heat is also generated due to the reactions at the cathode for producing water. To cool the fuel cells, channels that allow a coolant (generally, cooling water) to pass therethrough are formed in the separator for each cell or for a plurality of cells (e.g., two cells).

An example of a seal arrangement for fuel cells is disclosed in Japanese Laid-open Patent Publication No. 2000-182639. In this arrangement, gaskets for sealing coolant channels are provided at surfaces exposed to a coolant, and gaskets for sealing gas passages are provided at surfaces exposed to fuel or oxidizing gas. In the known fuel cell stack, components, such as electrolyte membranes, catalyst layers, gas diffusion layers, adhesive layers, and the like, are disposed in a region of the cells taken in the direction of lamination of the cells, in which region the gaskets are located. Namely, the gaskets overlap the above-mentioned components when viewed in the direction of lamination of the cells.

In the known fuel cell stack, however, the electrolyte membranes, catalyst layers, gas diffusion layers, and the adhesive layers located in the region of the cells overlapping the gasket seal lines in the direction of lamination of the cells are likely to creep when a load to fasten the fuel cell stack is applied. Thus, the materials of the above-indicated components may creep during operation of the fuel cells, which makes it difficult to maintain good sealing property of the gaskets.

SUMMARY OF THE INVENTION

It is therefore an object of the invention to provide a seal arrangement for fuel cells, which is able to maintain the initial sealing property of gaskets.

To accomplish the above and/or other object(s), there is provided according to one aspect of the invention a seal arrangement for a fuel cell, which comprises (a) at least one seal portion on an outer face of the fuel cell, and (b) at least one portion of the fuel cell with a constant-thickness structure having a substantially constant thickness as viewed in a direction of lamination of the fuel cell, wherein each seal portion includes a gasket, and each gasket overlaps one of the at least one constant-thickness structure portions of the fuel cell as viewed in the direction of lamination of the cell.

According to another aspect of the invention, there is provided a seal arrangement for a fuel cell, which comprises (a) a seal material adapted to seal off a clearance between a plurality of components of the fuel cell that are laminated on each other, and (b) at least one portion of the fuel cell with a constant-thickness structure having a substantially constant thickness as viewed in a direction of lamination of the fuel cell, wherein the constant-thickness structure is provided behind the seal material, along a seal line formed by the seal material after lamination of the plurality of components.

With the seal arrangements as described above, the portion of the cell located in the region in which the gasket or seal material is provided consists of constant-thickness components (i.e., components that do not creep or are unlikely to creep upon application of a load to fasten a fuel cell stack), or has a constant-thickness structure. Accordingly, the pressure at the seal plane of the gasket seal is not reduced or is less likely to be reduced, thus providing a reliable seal.

In one preferred form of the seal arrangement as described above, the seal portion comprising the gasket and an adhesive layer comprising an adhesive do not overlap each other in the direction of lamination of the cell (though the gasket and the adhesive layer may overlap each other at their intersections). With this arrangement, the pressure at the seal plane of the gasket seal portion is not reduced due to creeping of the adhesive as encountered in a conventional arrangement, and therefore gas leakage and/or water leakage can be avoided.

In another preferred form of the seal arrangement, the seal portion provides a coolant seal and a gas seal, and the coolant seal is located outside of the gas seal as viewed in the direction of lamination of the cell. In this case, even if water leakage occurs at the coolant seal, water is prevented from entering gas channels, thus assuring improved reliability of the fuel cell. Furthermore, since the coolant seal is located outside of the gas seal as viewed in the direction of lamination of the cell, coolant leakage would occur prior to gas leakage, and a countermeasure can be taken upon detection of the coolant leakage, thus assuring improved safety.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein.

DETAILED DESCRIPTION OF EXEMPLARY EMBODIMENT

Figure 4:
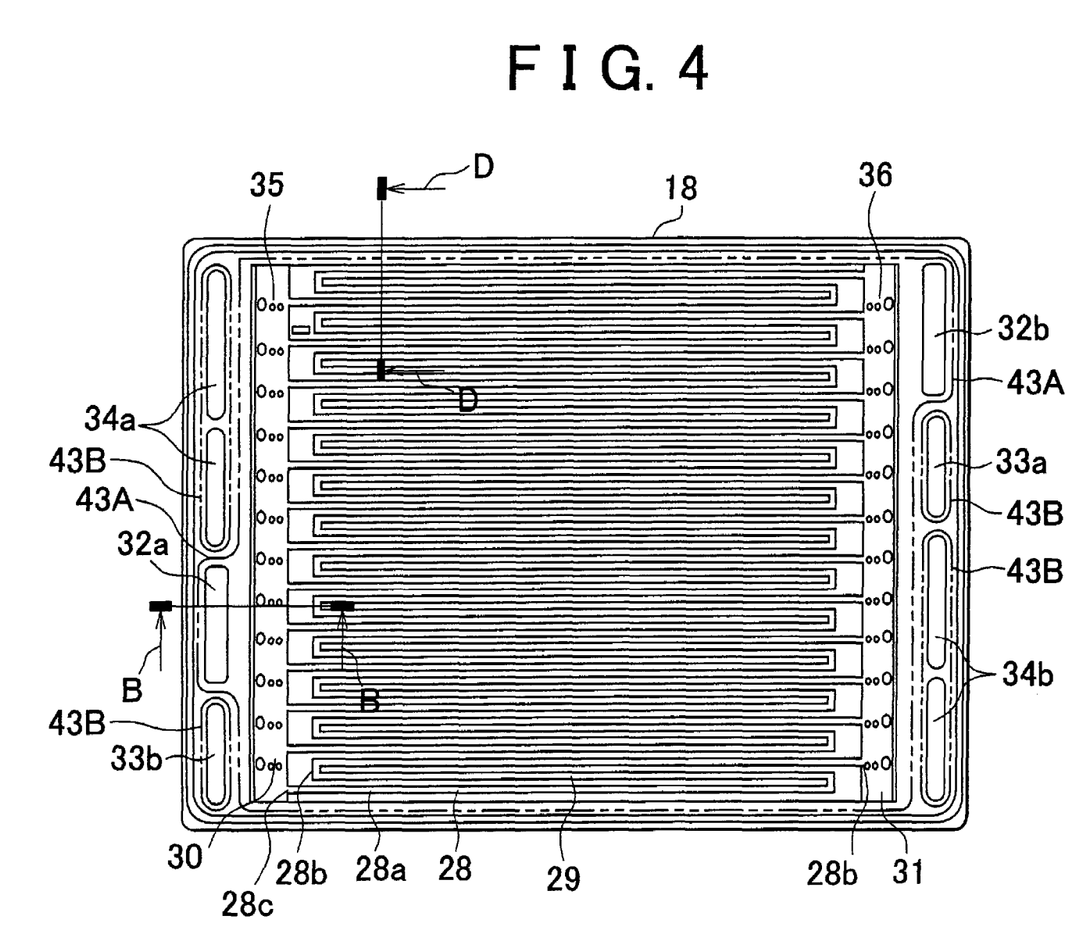
FIG. 4 is a plan view of the unit cell of the fuel cell structure of FIG. 1.
Figure 5:
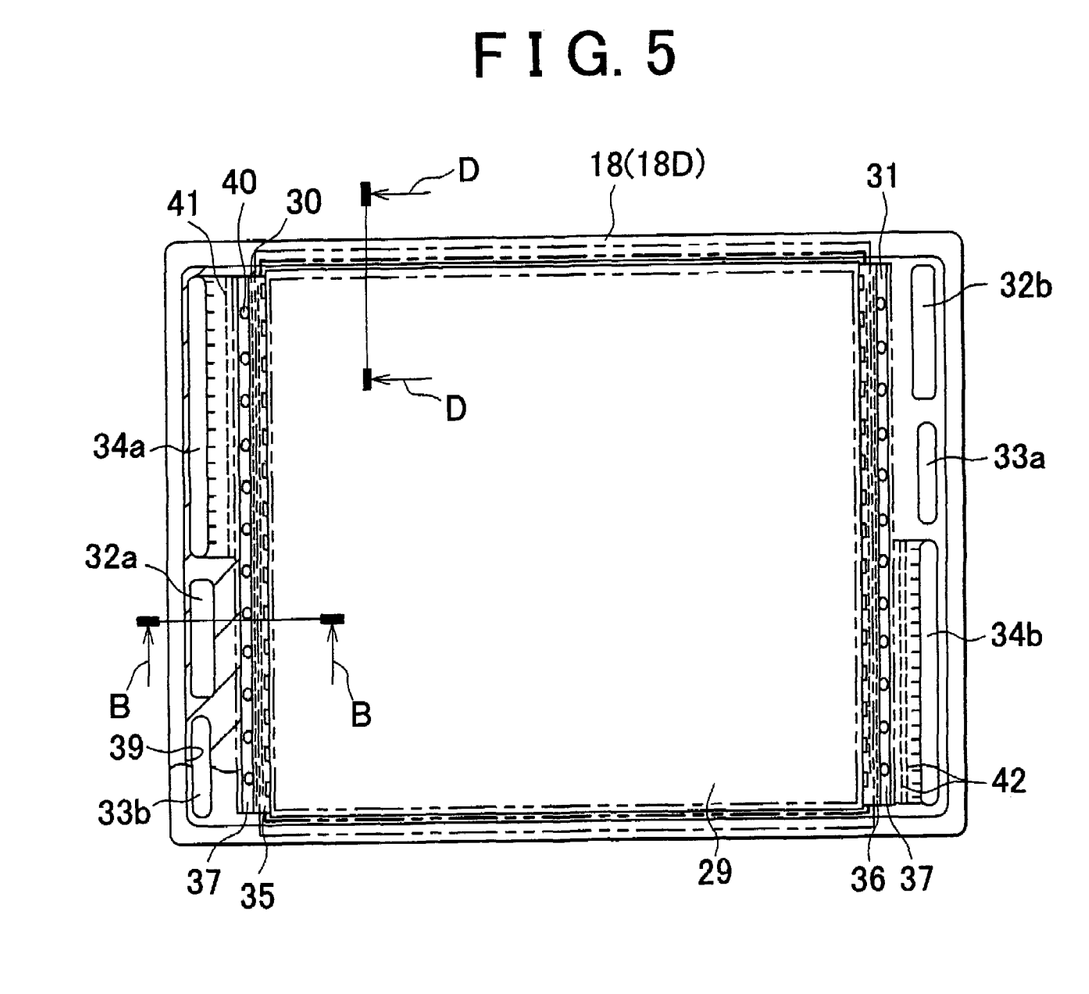
FIG. 5 is a plan view of a resin frame as a separator included in the fuel cell structure of FIG. 1.
Figure 6:
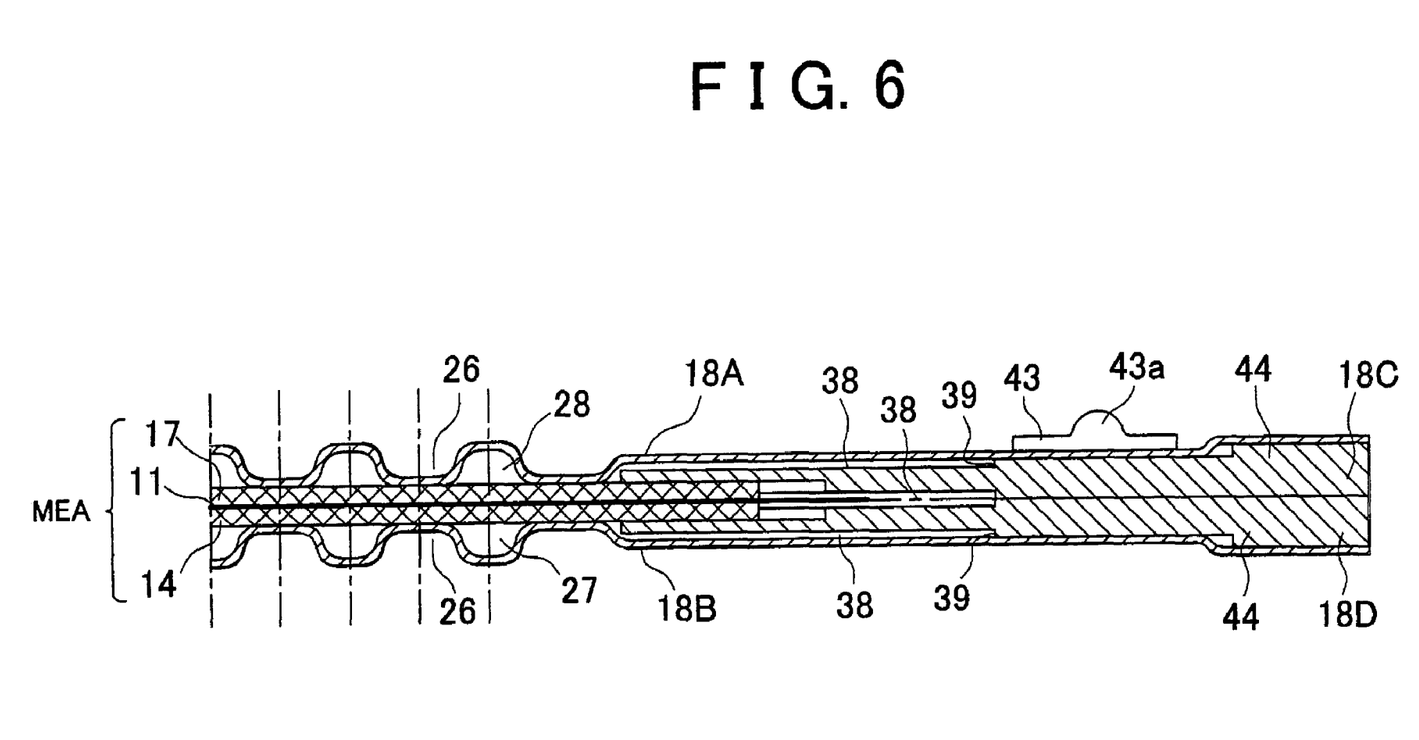
FIG. 6 is a cross-sectional view taken along a line denoted by arrows D in FIG. 4.
Figure 7:
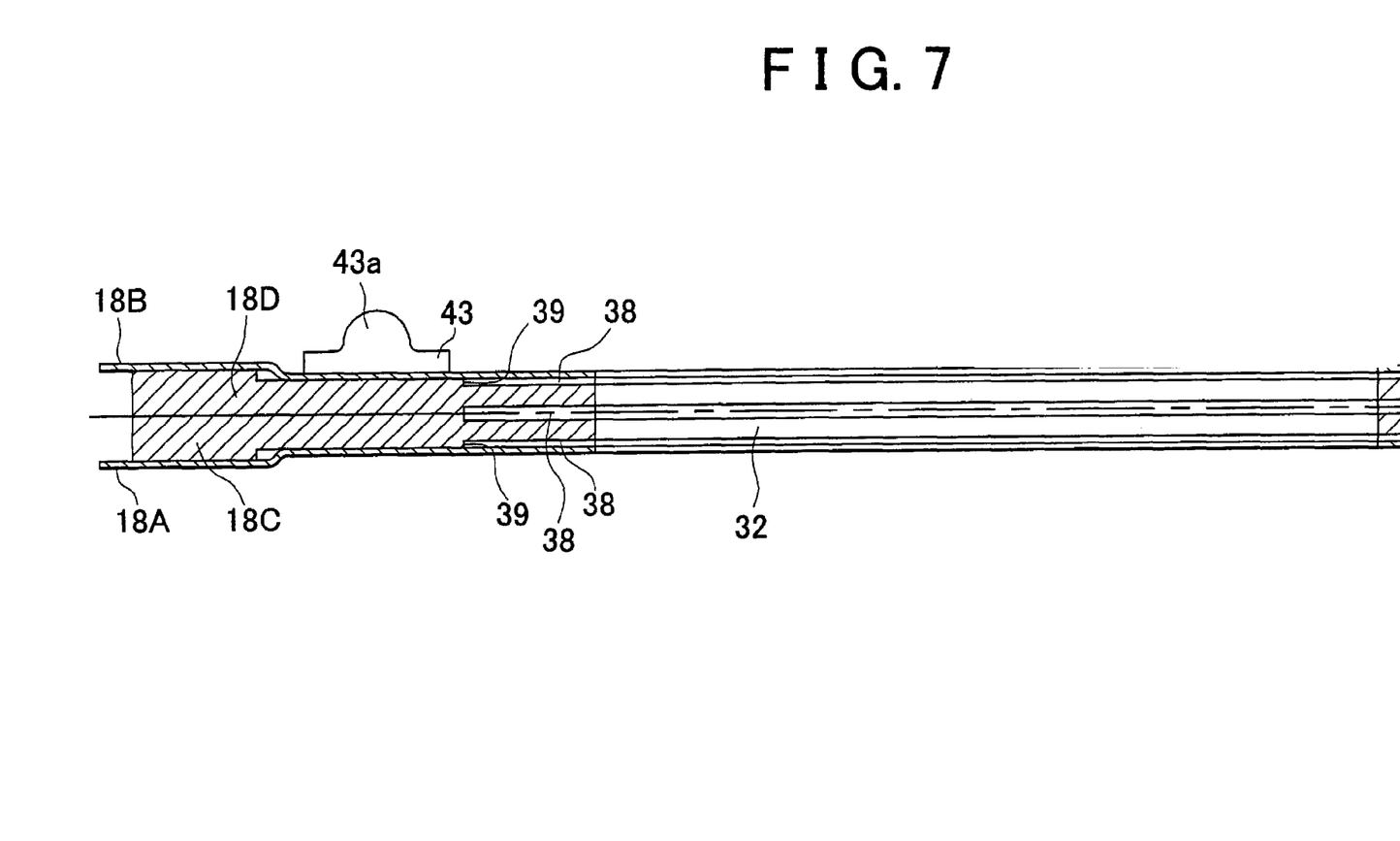
FIG. 7 is a cross-sectional view taken along a line denoted by arrows B in FIG. 4.

Referring to FIG. 1 through FIG. 9, a fuel cell stack employing a seal arrangement according to one exemplary embodiment of the invention will be described in detail. Of FIG. 1 to FIG. 9, FIG. 8 and FIG. 9 show conventional structures, while FIG. 6 and FIG. 7 show improvements thereof according to the invention.

Figure 1:
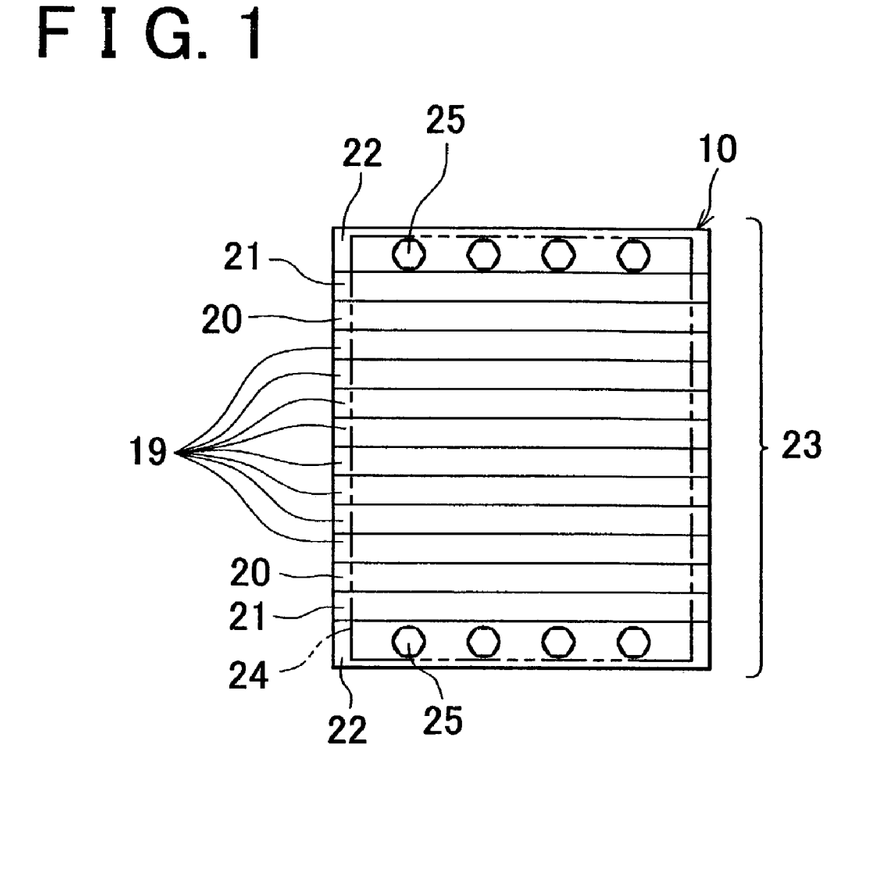
FIG. 1 is a schematic view generally showing a fuel cell structure to which the invention is applied, in which fuel cells are laminated in the vertical direction.

The seal arrangement according to the embodiment of the invention is employed in a solid polymer electrolyte fuel cell assembly 10 generally depicted in FIG. 1. The fuel cell assembly 10 is installed in, for example, a fuel cell vehicle, but may be used in other applications.

Figure 2:
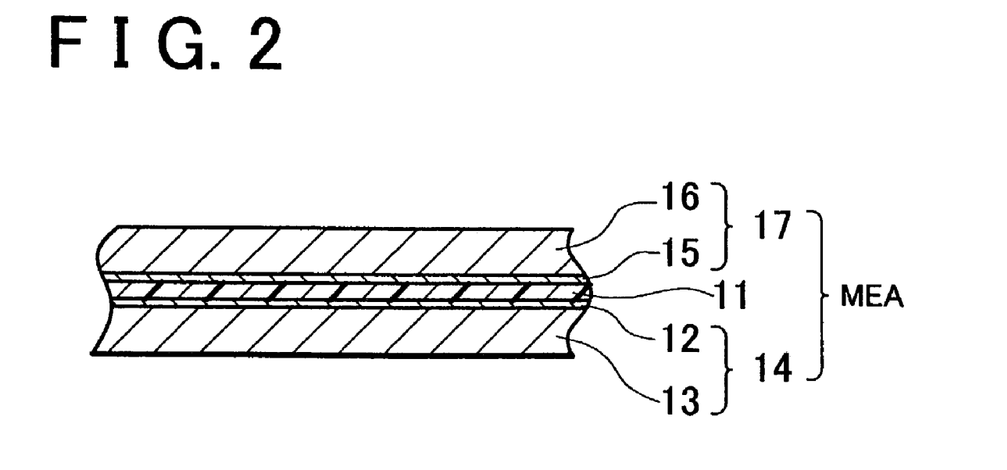
FIG. 2 is an enlarged cross-sectional view showing a part of an electrolyte membrane—electrode assembly of a unit cell of the fuel cell structure of FIG. 1.

Each cell of the solid polymer electrolyte fuel cell structure 10 includes a membrane-electrode assembly (MEA) that consists of an electrolyte membrane 11 in the form of an ion exchange membrane, an electrode 14 (anode or fuel electrode) including a catalyst layer 12 and a gas diffusion layer 13 formed on one major surface of the electrolyte layer 11, and an electrode 17 (cathode or air electrode) including a catalyst layer 15 and a gas diffusion layer 16 formed on the other major surface of the electrolyte layer 11, as shown in FIG. 2. A unit cell is constituted by the membrane-electrode assembly (MEA), and separators 18 laminated on the MEA to form reaction gas channels 27, 28 through which fuel gas (hydrogen) and oxidizing gas (oxygen, or generally air) are supplied to the electrodes 14, 17 and coolant channels (which may also be called coolant water channels) through which a coolant (which is normally coolant water) flows. A laminated assembly of at least one cell (one cell in this embodiment) constitutes a module 19, and a plurality of modules 19 are laminated on each other to provide a set of modules 19.

Terminals 20, insulators 21 and end plates 22 are disposed on the opposite ends of the set of modules 19 as viewed in the direction of lamination of the cells, so as to provide a fuel cell stack 23. The fuel cell stack 23 is then fastened at the outside thereof by fastening members 24 (such as tension plates or through-bolts) that extend in the direction of lamination of the cells, and is fixed by bolts 25 or nuts.

The coolant channels 26 are provided for each cell or for a plurality of cells. The catalyst layers 12, 15 are formed of platinum (Pt), carbon (C) and an electrolyte. The gas diffusion layers 13, 16 are formed of carbon (C).

Figure 3:
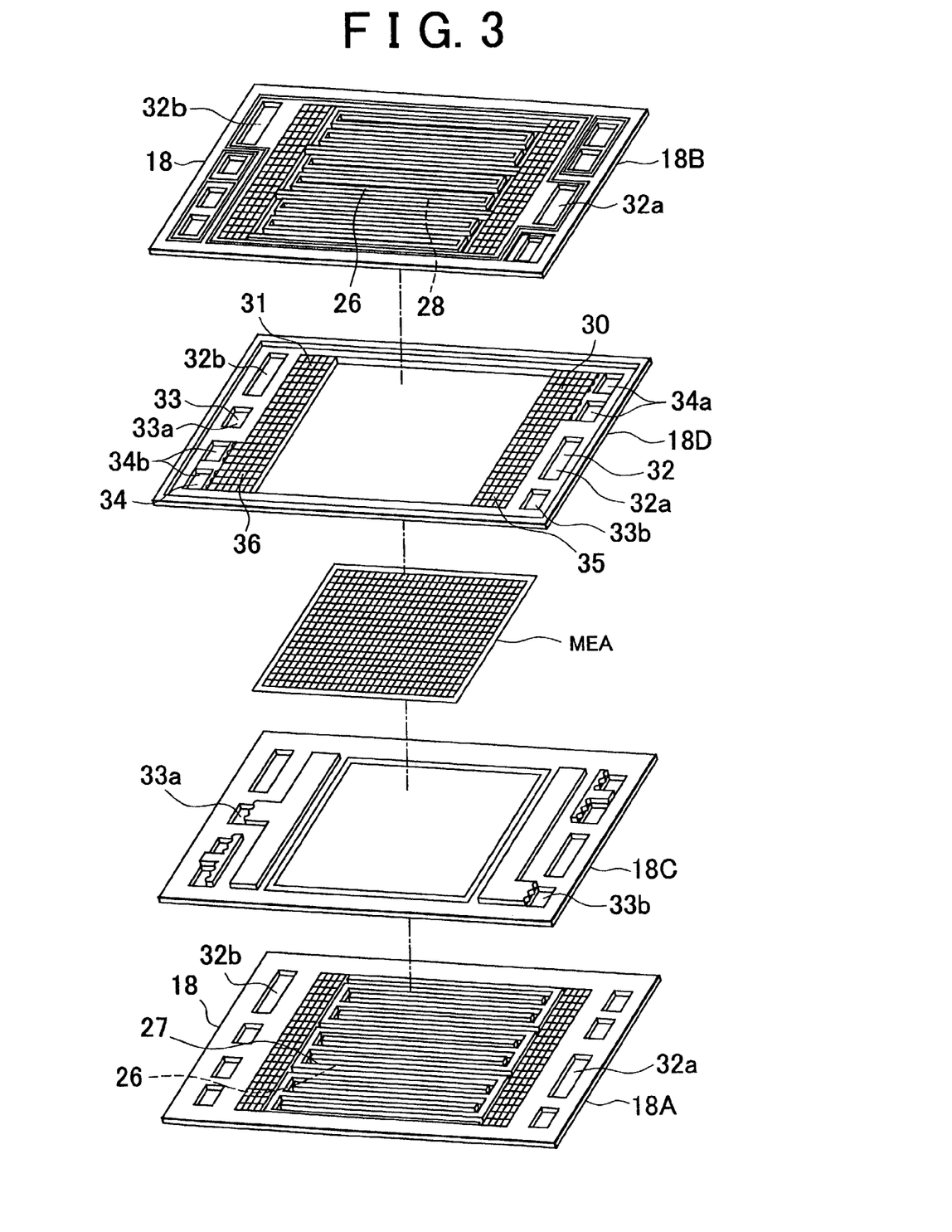
FIG. 3 is an exploded perspective view of a unit cell of the fuel cell structure of FIG. 1, wherein components of the unit cell are to be laminated in the vertical direction.

The separators 18 include first separator members 18A, 18B, and second separator members 18C, 18D each of which takes the form of a frame having an aperture at a portion 29 that corresponds to or overlaps a power generating portion of the fuel cell, as depicted in FIG. 3. In the following description, this portion 29 will be referred to as "MEA overlapping portion".

The first member 18A and the second member 18C are disposed on the side of the fuel electrode of the MEA, and the first member 18A defines channels for fuel gas and cooling water. The first member 18B and the second member 18D are disposed on the side of the air electrode of the MEA, and the first member 18B defines channels for oxidizing gas and cooling water.

The first members 18A, 18B are made of a metal, and will be hereinafter called "metal separators 18A, 18B". The second members 18C, 18D are made of a non-conductive resin material, and will be hereinafter called "resin frames 18C, 18D". The metal separators 18A, 18B made of metal has a fluid impermeability, and may be formed by plating a metal plate (such as a stainless steel plate) with a conductive metal (such as nickel).

As shown in FIG. 3, the MEA is sandwiched by the separators 18, such that the resin frames 18C, 18D are respectively interposed between the metal separators 18A, 18B and the MEA. Thus, the metal separator 18A, resin frame 18C, MEA, resin frame 18D and the metal separator 18B are laminated in the order of description, as depicted in FIG. 3.

With the apertures formed through the resin frames 18C, 18D, the MEA faces the MEA overlapping portions 29 of the metal separator 18A and the metal separator 18B through the apertures. Namely, the metal separator 18A, the MEA and the metal separator 18B are arranged in this order in the direction of lamination of the cells. At the periphery of the apertures of the resin frames 18C, 18D, the metal separator 18A resin frame 18C, resin frame 18D and the metal separator 18B are laminated on each other in the order of description.

As shown in FIG. 3 through FIG. 7, a gas channel portion that defines the fuel gas channels 27 are formed in the surface of the MEA overlapping portion 29 of the metal separator 18A that corresponds to the power generating portion of the fuel cell. Also, the coolant channels 26 are formed in the other surface of the metal separator 18A. Similarly, a gas channel portion that defines the oxidizing gas channels 28 are formed in the surface of the MEA overlapping portion 29 of the metal separator 18B that corresponds to the fuel cell power generating portion. The fuel gas channels 27 and the oxidizing gas channels 28 are formed in alignment with each other in the direction of lamination of the cell with the MEA interposed between these gas channels 27 and 28.

The coolant channels 26 formed in the other surface of the metal separator 18A opposite to the MEA and the coolant channels 26 formed in the surface of the metal separator 18B of the adjacent (next repeating) cell opposite to the MEA of this cell are not partitioned from each other in the direction of lamination of the cells, such that the coolant channels 26 communicate with the coolant channels 26 of the adjacent cell.

In the gas channel portions of the metal separators 18A, 18B, the gas channels extend between a pair of edge portions 30, 31 of each metal separator 18A, 18B at the longitudinal ends of the MEA overlapping portion 29, such that each gas channel turns several times at the longitudinal ends thereof to thus provide an increased channel length, as shown in FIG. 4 illustrating the metal separator 18B by way of example. With this arrangement, assuming that the same quantity of reaction gases are supplied to the MEA, the gas flow velocity increases (as compared with the case where the gas channels include no turns), so that the fuel cell generates increased power, and water produced in the fuel cell is less likely to remain in the gas channels 27, 28. In the metal separators 18A, 18B, a plurality of fuel gas channels 27 are formed in parallel with each other, and a plurality of oxidizing gas channels 28 are formed in parallel with each other. On the other hand, the coolant channels 26 formed on the rear surfaces of the metal separators 18A, 18D extend straight between the edge portions 30, 31, and include no U-turn portions.

As shown in FIG. 3 through FIG. 5, a fuel gas inlet 27c and a fuel gas outlet 27d communicating with each fuel gas channel 27 formed in the MEA overlapping portion 29 of the metal separator 18A are located at the longitudinally opposite sides of the MEA overlapping portion 29. Similarly, an oxygen gas inlet 28c and an oxygen gas inlet 28d communicating with each oxygen gas channel 28 formed in the MEA overlapping portion 29 of the metal separator 18B are located at the longitudinally opposite sides of the MEA overlapping portion 29.

Also, the fuel gas inlets 27c leading to the fuel gas channels 27 in the MEA overlapping portion 29 of the separator 18A and the oxygen gas inlets 28c leading to the oxygen gas channels 28 are located at the longitudinally opposite sides of the MEA overlapping portions 29 of the separators 18A, 18B.

Manifold portions are formed in the edge portions 30, 31 of each of the metal separators 18A, 18B and the resin frames 18C, 18D on the longitudinally opposite sides of the MEA overlapping portion 29 corresponding to the fuel cell power generating portion. In the manifold portions are formed coolant manifolds 32, fuel gas manifolds 33 and air manifolds 34.

More specifically, an inlet-side coolant manifold 32a, an outlet-side fuel gas manifold 33b and inlet-side air manifold (s) 34a are formed in one (30) of the edge portions 30, 31 of each separator 18A, 18B, 18C, 18D on the opposite sides of the MEA overlapping portion 29. An outlet-side coolant manifold 32b, an inlet-side fuel gas manifold 33a and outlet-side air manifold(s) 34b are formed in the other (31) of the edge portions 30, 31 of each separator 18A, 18B, 18C, 18D.

The fuel gas manifolds 33a, 33b and the air manifolds 34a, 34b are offset from the center position of the gas channel portion in which the gas channels 27, 28 are located, in the direction perpendicular to the direction in which the edge portions 30, 31 are opposed to each other. Namely, the center positions of the fuel gas manifolds 33a, 33b and the air manifolds 34a, 34b deviate from the center position of the gas channel portion in the direction perpendicular to the direction in which the edge portions 30, 31 are opposed to each other. The direction in which the edge portions 30, 31 are opposed to each other will be hereinafter referred to as "the opposing direction of the edge portions 30, 31".

As shown in FIG. 5, gas channel communicating portions 37 that communicate the manifold portions with the gas channel portions are formed in the resin frames 18C, 18D. Gas flow control portions 35, 36 formed in the gas channel communicating portions 37 function to direct the flow of gas into the direction perpendicular to the opposing direction of the edge portions 30, 31, while making the flow of gas into or out of the gas channel portion even or uniform in the direction perpendicular to the opposing direction of the edge portions 30, 31. The gas flow control portion 35 causes gas (i.e., air) flowing from the inlet-side air manifold 34a to uniformly spread over the entire width of the gas channel portion and thus flow into the gas channel portion, and the gas flow control portion 36 causes gas flowing from the gas channel portion to be collected into a reduced length equal to the length of the outlet-side air manifold 34b and thus discharged into the air manifold 34b.

Each of the gas flow control portions 35, 36 have the same or similar structure. Each of the gas flow control portions 35, 36 consists of a multiplicity of projections formed by dividing at least one rib (two in the illustrated embodiment) that extend in the direction perpendicular to the opposing direction of the edge portions 30, 31, at equal intervals in the longitudinal direction of the rib (i.e., the direction perpendicular to the opposing direction of the edge portions 30, 31). When a gas passes the gas flow control portions 35, 36, the gas flow is once directed into the longitudinal direction of the ribs (projections) and then the gas flows into or out of the gas channel portion while passing through a multiplicity of equally spaced clearances between the multiple projections. In this manner, the flow of gas into or out of the gas channel portion is made uniform or even in the direction perpendicular to the opposing direction of the edge portions 30, 31.

The resin frames 18C, 18D are formed with a multiplicity of projections 40 that project toward the metal separators 18A, 18B, respectively for ensuring the required height of the gas channels. The projections 40 are arranged in a row in the width direction of the resin frame 18C, 18D, between the corresponding gas flow control portion and the manifold portion.

The projections 40 serve to prevent the metal separators 18A, 18B from being displaced toward the resin frames 18C, 18D, respectively, when the components of the cells are fastened together in the direction of lamination of the cells, to thereby maintain the height of the gas channels formed between the metal separators 18A, 18B and the resin frames 18C, 18D at the nominal level.

The resin frames 18C, 18D further include flow resistance portions 41, 42 formed in the gas channel communicating portions 37 provided in the edge portions 30 on the opposite sides of the MEA overlapping portion 29 (i.e., the aperture of each frame). The flow resistance portions 41, 42 thus formed serve to reduce a difference in the pressure at the gas inlets and outlets between the gas flow communicating portions 37 and the gas channel portion of the MEA overlapping portion 29 corresponding to the fuel cell power generating portion, to achieve more uniform distribution of the gas into the gas flow channel portion.

As shown in FIG. 3, FIG. 4, FIG. 6 and FIG. 7, seal portions 43 in the form of gaskets are provided between the metal separators of the adjacent cells, so as to seal off the coolant manifolds 32a, 32b, fuel gas manifolds 33a, 33b and the air manifolds 34a, 34b. The seal portions 43 are provided by rubber seals, and seal lines on which the seals exist are indicated by two-dot chain lines in FIG. 4. Each of the gaskets 43 includes a protruding portion 43a, and has a generally T-shaped cross section. In this case, the seal lines as indicated above correspond to the protruding portions 43a of the gaskets 43. The gaskets may be replaced by O rings.

As shown in FIG. 5, FIG. 6 and FIG. 7, adhesive seal portions 38 (hatched regions in FIG. 5) in which an adhesive is applied are formed between the resin frames 18C, 18D and the adjacent components (metal separators or resin frames) in the direction of lamination of the cell, to seal off clearances between the resin frames 18C, 18D and the adjacent components, thereby to seal off the coolant manifolds 32a, 32b, fuel gas manifolds 33a, 33b and the air manifolds 34a, 34b.

As shown in FIG. 6 and FIG. 7, stepped portions 39 are formed in the resin frames 18C, 18C at boundaries between portions where the adhesive is applied to form the seal portions 38 and portions where no adhesive is applied. The stepped portions 39 serve to prevent the adhesive for sealing from entering the portions where no adhesive is to be applied, or from running out from the adhesive seal portions 38.

As shown in FIG. 6 and FIG. 7, the portions of the fuel cells located in regions (as viewed in the direction of lamination of the cells) that overlap the seal portions 43 in the form of gaskets (or protrusions 43a of the seal portions 43, if any) are constructed with a constant thickness. Namely, in the seal arrangement of the fuel cells including the seal materials 43 to provide seals between two or more components of the fuel cells (as a laminated assembly of a plurality of components), constant-thickness structures are provided behind the seal materials 43, along the seal lines formed by the seal materials 43 after lamination of the plurality of components.

The constant-thickness structure is to be interpreted to mean a structure in which its components do not creep or are unlikely to creep when a load is applied to the fuel cell stack 23 for fastening the stack. In this connection, the separators 18A, 18B, 18C and 18D do not creep or are unlikely to creep, and therefore a structure including only these components provide a constant-thickness structure. However, the electrolyte membrane 11, catalyst layers 12, 15, diffusion layers 13, 16 and the adhesive seal portions 38 are likely to creep when a fastening load is applied to the fuel cell stack 23, and thus do not provide a constant-thickness structure.

Figure 8:
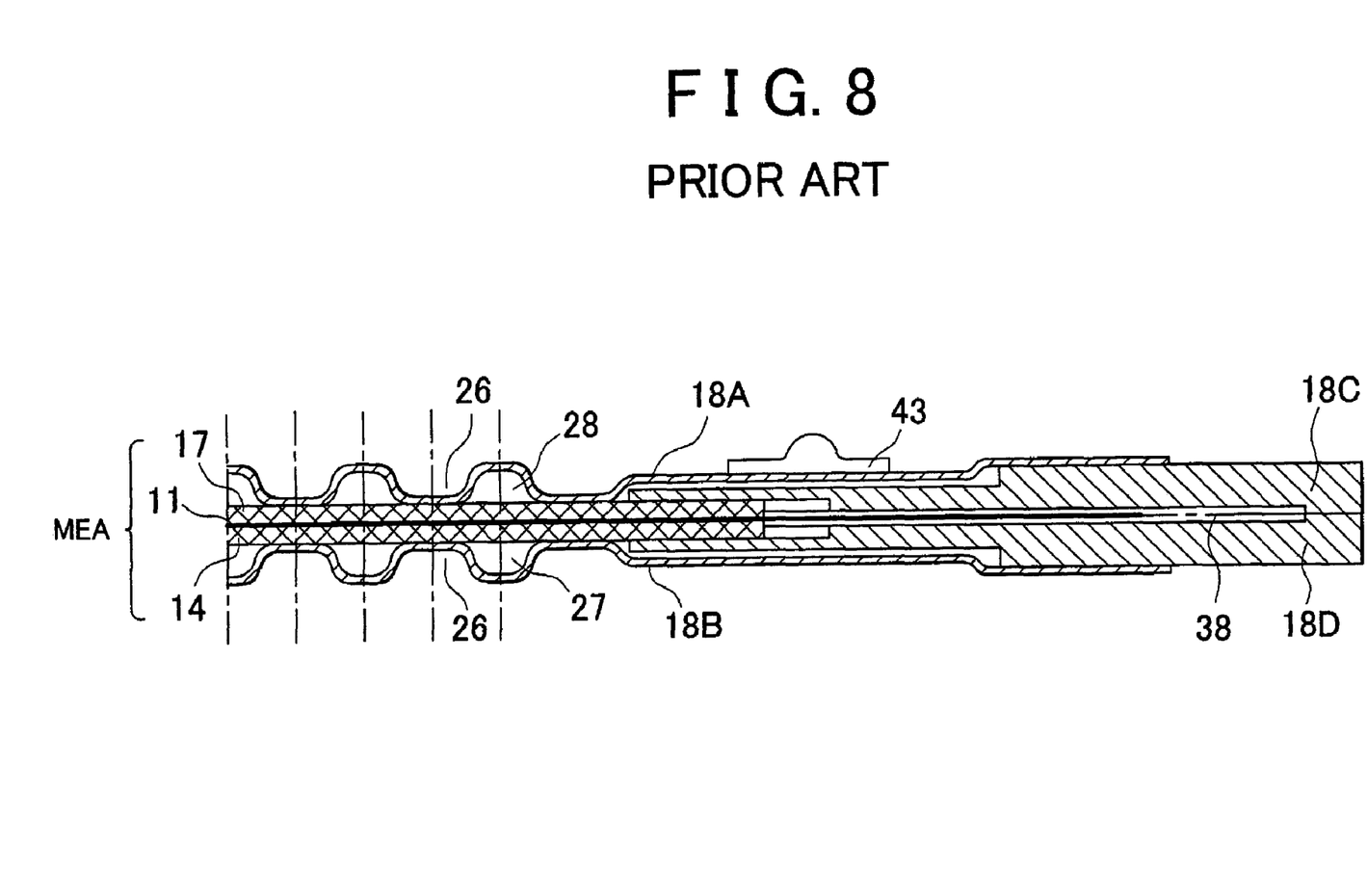
FIG. 8 is a cross-sectional view corresponding to that of FIG. 6, showing a conventional arrangement.
Figure 9:
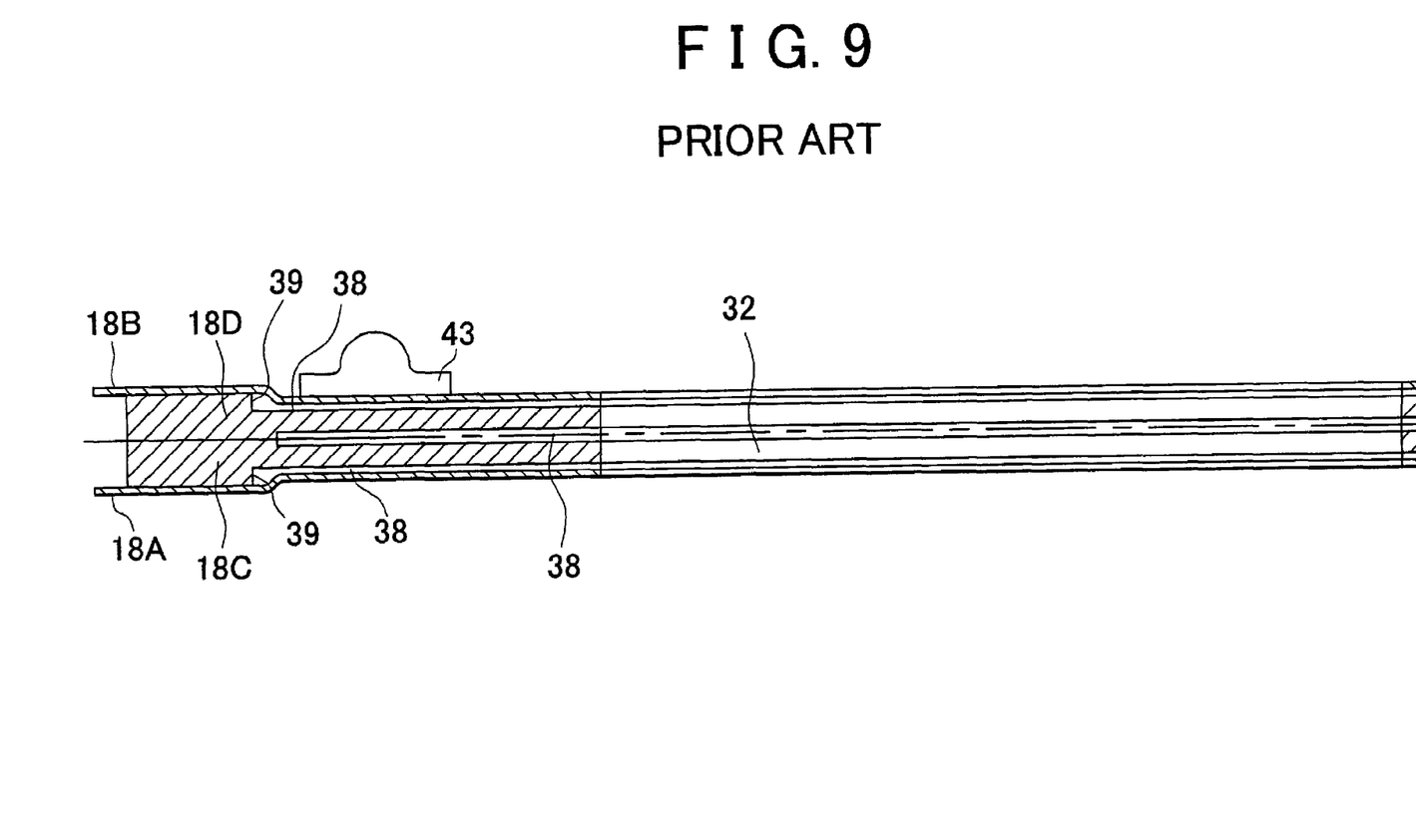
FIG. 9 is a cross-sectional view corresponding to that of FIG. 7, showing a conventional arrangement.

Prior to improvements according to the invention, the portions of the fuel cells located in the regions of the seal portions 43 provided by gaskets as viewed in the direction of lamination of the cells include, for example, the adhesive seal portion 38 or the electrolyte membranes 11, as is understood from FIG. 8 and FIG. 9 showing conventional arrangements. Therefore, if the adhesive seal portions 38 or the electrolyte membranes 11 creep upon application of a fastening load to the fuel cell stack 23, a pressure at the seal surfaces of the seal portions 43 is reduced, which may result in leakage of gas or leakage of water.

With the seal arrangement improved according to the invention, the portions of the fuel cells located in the regions of the seal portions 43 provided by gaskets as viewed in the direction of lamination of the cells consist solely of the separators 18A, 18B, 18C, 18D. Furthermore, the resin frames 18C, 18D, out of the separators 18A, 18B, 18C, 18D, have an increased thickness (large-thickness portions 44) outside of the seal portions 43 provided by the gaskets, and the separators 18A, 18B, 18C, 18D are in direct contact with each other at the large-thickness portions 44. Therefore, even if the rubber material of the gasket seal portions 43 deforms, the dimensions of the directly contact portions of the separators 18A, 18B, 18C, 18D and the portions of the separators 18A, 18B, 18C, 18D located behind the rubber seals do not change in the direction of lamination of the cells, thus providing a constant-thickness structure. Accordingly, the pressure at the seal surfaces of the gasket seal portions 43 is not reduced as in the conventional arrangement even in the presence of a fastening load applied to the fuel cell stack, and therefore the fuel cell structure is substantially free from gas leakage or water leakage.

In the arrangement of the present embodiment of the invention, the protruding portions 43a of the seal portions 43 provided by gaskets and the adhesive layers 38 do not overlap each other as viewed in the direction of lamination of the cells (though portions of the gaskets 43 other than the protruding portions 43 may overlap the adhesive layers 38). Namely, the seal lines (as indicated by two-dot chain lines in FIG. 4) of the gaskets 43 are located outside (i.e., remote from the manifolds 32, 33, 34) of the regions of the adhesive layers 38 (indicated by hatched regions in FIG. 5). It is, however, to be noted that the seal lines of the gasket seal portions 43 are curved within the cell plane, and may partially intersect with the adhesive layers 38 as viewed in the direction of lamination of the cells. The overlapping of the gaskets 43 with the adhesive layers 38 at these intersections may be permitted.

With the above arrangement having no, or almost no, overlap, the pressures at the seal surface of the gasket seal portions 43 are not reduced due to creeping of the adhesive as in the conventional arrangement, and therefore gas leakage or water leakage can be advantageously avoided.

The gasket seal portions 43 include gas seals 43B and coolant seals 43A. The gas seals 43B surround the gas manifolds 33a, 33b, 34a, 34b and the gas channels 27, 28 to seal off these manifolds and channels, and the coolant seals 43A surround the coolant manifolds 32a, 32b and coolant channels 26 to seal off these manifolds and channels. Each of the gas seals 43B and the coolant seals 43A is formed from a rubber gasket having the same cross-sectional shape.

The coolant seals 43A are located outside (on the side remote from the manifolds 32, 33, 34) of the gas seals 43B as viewed in the direction of lamination of the cells. With this arrangement, even if water leakage occurs at the coolant seals 43A, the leaking water does not enter the gas channels, and therefore no flooding or no failure in power generation takes place due to the entry of the water into the gas channels. Also, since the coolant seals 43 are located outside of the gas seals 43B as viewed in the direction of lamination of the cells, coolant leakage occurs before gas leakage, and a countermeasure can be taken upon detection of the coolant leakage, thus assuring improved safety.

In the meantime, the conventional fuel cell structure as shown in FIG. 8 and FIG. 9 may suffer from a problem as follows: when a certain load is applied to a fuel cell stack consisting of a plurality of conventional fuel cells constructed as shown in FIG. 8 and FIG. 9, the metal separator 18A adjacent to the gasket 43 may deform, which may result in leakage of the coolant that is present between the metal separators 18A, 18B of the adjacent cells. This problem occurs due to relatively small rigidity of the metal separators 18A, 18B and the elasticity of each adhesive layer provided between the metal separator 18A (18B) and the resin frame 18C (18D).

Figure 10:
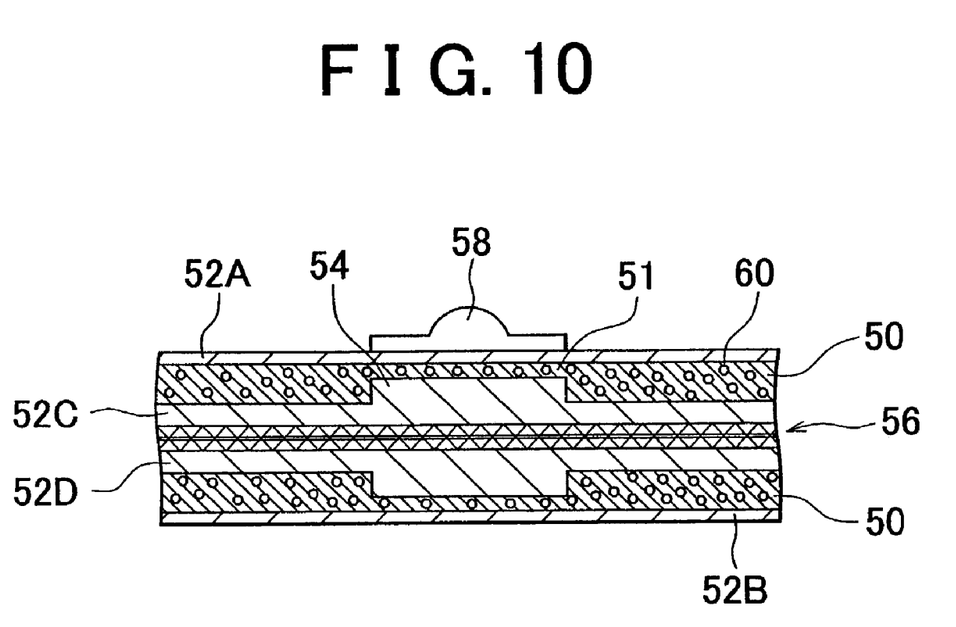
FIG. 10 is a cross-sectional view of a fuel cell structure according to another embodiment of the invention.

Referring next to FIG. 10, there will be described a fuel cell structure according to another embodiment of the invention, which has been developed in view of the above-described problem. In the structure of FIG. 10, a metal separator 52A, an adhesive layer 50, a resin frame 52C, a membrane-electrode assembly (MEA) 56, a resin frame 52D, another adhesive layer 50, and a metal separator 52B are laminated in the order of description. Furthermore, a gasket 58 similar to the gasket 43 of the previous embodiment is disposed on an outer surface of the metal separator 52A. The adhesive layer 50 contains a multiplicity of beads 60 each having a diameter of about 50 µm, and includes a small-thickness portion 51 that has a smaller thickness than the other portions of the adhesive layer 50. The small-thickness portion 51 is located in a region in which the gasket 58 is located as viewed in the direction of lamination of fuel cells, namely, is aligned with the gasket 58 as viewed in the vertical direction in FIG. 10. Also, each of the resin frames 52C, 52D includes a backup portion 54 formed as an integral part thereof, which has a larger thickness than the other portions of the resin frame 52C, 52D. The backup portion 54 is also located in the region in which the gasket 58 is located as viewed in the direction of lamination of fuel cells, namely, is aligned with the gasket 58 and the small-thickness portion 51 of the adhesive layer 50 as viewed in the vertical direction in FIG. 10.

In fabricating the fuel cell structure as shown in FIG. 10, the gasket 58 is bonded onto the metal separator 52A, and the resin frames 52C, 52D are bonded onto the MEA 56. The resulting assembly of the resin frames and the MEA is then bonded to the separators 52A, 52B via the adhesive layers 50 containing the beads 60. The resultant fuel cell is laminated on adjacent cells which are constructed similarly, and a certain load is applied to the fuel cell stack.

When the fuel cells as described are laminated on each other, the backup portions 54 of the resin frames 52C, 52D and the beads 60 contained in the adhesive layers 50 serve to sustain the load applied to the fuel cell stack. As a result, the gasket 58 disposed between the adjacent fuel cells deforms, thereby assuring sufficient sealing property and preventing leakage of the coolant. In addition, the thickness of the adhesive layer 50 does not vary significantly due to the presence of the beads 60, which makes it possible to manufacture fuel cells having a substantially constant thickness. With the thickness of the fuel cells thus made stable or constant, the proportion of the loads applied to the MEA and the gasket of each fuel cell at the time of lamination of fuel cells is made substantially constant, thus leading to reduced variations in the performance of the fuel cells.

What is claimed is:

1. A fuel cell, comprising:
 a pair of separators,
 at least one structure disposed between the separators, the pair of separators and the at least one structure forming a constant-thickness structure portion which is unlikely to creep, and
 a gasket disposed on an outer face of one of the separators, wherein the at least one structure between the separators abuts an inner face of the separator opposite to the gasket to support the gasket; and
 an adhesive layer disposed between the separators, wherein the adhesive layer does not overlap with the gasket in the direction of lamination of the fuel cell, and does not support the gasket.

2. The fuel cell according to claim 1, wherein the gasket provides a gas seal and a coolant seal.

3. The fuel cell according to claim 2, wherein the coolant seal is located outside of the gas seal.

4. The fuel cell according to claim 1, wherein the fuel cell includes at least one manifold, and wherein the gasket seals off the at least one manifold.

5. The fuel cell according to claim 4, wherein the gasket provides a gas seal and a coolant seal, and wherein the coolant seal is located outside of the gas seal.

6. The fuel cell according to claim 1, wherein the gasket does not overlap a membrane-electrode assembly of the fuel cell.

7. The fuel cell according to claim 1, further comprising another adhesive layer containing a plurality of beads.

8. A fuel cell comprising:
 a membrane-electrode assembly;
 a separator adjacent to each surface of the membrane-electrode assembly,
 at least one structure disposed between the separators, the separators and the at least one structure forming a constant-thickness structure portion which is unlikely to creep; and
 a gasket located on an outer face of one of the separators, wherein the gasket overlaps a portion of the fuel cell as viewed in a direction of lamination of the cell that has the constant-thickness structure portion, the constant thickness structure portion-abutting an inner face of the separator on which the gasket is located to support the gasket; and
 an adhesive layer within the fuel cell, wherein the gasket and the adhesive layer do not overlap each other in the direction of lamination of the cell.

9. The fuel cell according to claim 8, wherein the gasket does not overlap the membrane-electrode assembly.

10. The fuel cell according to claim 8, further comprising: another adhesive layer containing a plurality of beads.

11. The fuel cell according to claim 1, wherein the separators are metal separators.

* * * * *

UNITED STATES PATENT AND TRADEMARK OFFICE
CERTIFICATE OF CORRECTION

PATENT NO. : 7,498,096 B2  
APPLICATION NO. : 10/349946  
DATED : March 3, 2009  
INVENTOR(S) : Toshiyuki Inagaki et al.

It is certified that error appears in the above-identified patent and that said Letters Patent is hereby corrected as shown below:

| Column | Line | |
|---|---|---|
| 5 | 21 | Change "separators 18A, 18D" to --separators 18A, 18B--. |
| 7 | 8 | Change "resin frames 18C, 18C" to --resin frames 18C, 18D--. |

Signed and Sealed this

Eleventh Day of August, 2009

David J. Kappos
*Director of the United States Patent and Trademark Office*